United States Patent [19]

Alt

[11] Patent Number: 5,790,345
[45] Date of Patent: Aug. 4, 1998

[54] DISK CLAMP WITH TABS SHAPED TO APPLY EQUAL FORCES AT EQUALLY SPACED LOCATIONS AROUND AN AXIS OF ROTATION OF A DISK DRIVE

[75] Inventor: Robert A. Alt, Longmont, Colo.

[73] Assignee: Integral Peripherals, Inc., Boulder, Colo.

[21] Appl. No.: 751,186

[22] Filed: Nov. 15, 1996

[51] Int. Cl.[6] .................................................. G11B 17/08
[52] U.S. Cl. ................................................... 360/98.08
[58] Field of Search ............................. 360/98.08, 99.12

[56] References Cited

U.S. PATENT DOCUMENTS 4,918,545  4/1990  Scheffel ........................... 360/98.08
5,517,376  5/1996  Green ............................... 360/98.08

Primary Examiner—A. J. Heinz
Attorney, Agent, or Firm—Skjerven, Morrill, MacPherson, Franklin & Friel; David E. Steuber; Adrian J. Lee

[57] ABSTRACT

A disk drive apparatus including a drive motor with disks separated by annular spacers disposed around a spindle. The disks are held in place by an annular hub which is held in place by a shaped disk clamp that is shaped to apply substantially equal forces to equally spaced locations around the annular hub. The disk clamp is fastened to the spindle and T-shaped load tabs that apply force to the annular hub. The annular hub has a conical surface and the conical angle is greater than the angle the T-shaped load tabs assume when deflected when fastened to the spindle.

15 Claims, 5 Drawing Sheets

DISK CLAMP WITH TABS SHAPED TO APPLY EQUAL FORCES AT EQUALLY SPACED LOCATIONS AROUND AN AXIS OF ROTATION OF A DISK DRIVE

BACKGROUND OF THE INVENTION

1. Field of the Invention

This invention relates generally to disk drives and more particularly, to an apparatus for mounting disks to a disk drive with substantially equal force applied to the disks at equally spaced locations around the axis of rotation of the disk drive.

2. Discussion of the Related Art

The disk-spindle assembly is the heart of a rigid disk drive in a computer system. Although the disks and the annular spacers used to separate the disks are manufactured to precise specifications, the disk stack tolerances cause variations in the final stack height. Variations in stack height caused by changes in temperature must also be accommodated without causing distortion of the disks. As the disk drives have become miniaturized, the size of the annular spacers and the thickness of the disks have both been reduced. However, these delicate parts must have uniform tension applied to them when clamped to the disk drive to avoid warpage of the disks. Any warpage of the disks can affect the reliability of the data due to the varying distance the head flies above a warped disk. As can be appreciated, a large warpage would cause the head to contact the disk and a catastropic failure could occur. A further design requirement is that the disk clamp have as little vertical profile as possible in order to allow as many disks as possible to be stacked within the fixed mechanical dimension of the miniaturized disk drives. In an ideal disk drive apparatus the disk clamp and the associated clamping hardware would not extend above the upper load bearing spacer ring. An additional desirable attribute is that the disk drive apparatus is easy to assemble and that particulates are not generated during assembly. In the prior art devices which have a disk clamp that provides a continuous line contact to the disks, any variation in the disk clamp thickness, spring constant, or other parameter causes the application of a non-uniform force to the disks. In addition to being non-uniform, the distribution of the force is not predictable and non-repeatable.

What is needed is a disk drive assembly that applies a sufficient clamping force to the disks in a uniform predictable manner, has a low vertical profile, and is easy to assemble without the generation of particulates.

SUMMARY OF THE INVENTION

The present invention is directed to a disk drive apparatus which includes a drive motor with a spindle, one or more disks, annular spacers between adjacent disks, an annular hub, a disk clamp shaped to apply substantially equal forces to a predetermined number of equally spaced locations on the annular hub, and a selected number of fasteners to fasten the disk clamp to the spindle.

The shaped disk clamp has multiple load tabs equal in number to the selected number of fasteners. The center line of each load tab is located between adjacent fasteners which are equally spaced around the rotational axis of the spindle. Each load tab applies a substantially equal force to four of the equally spaced locations on the annular hub.

Each load tab has an outer edge having a flat portion with a radial arc portion on each side of the flat portion.

The intersections of the flat portion and the radial arc portions define two of the locations at which a force is applied to the annular hub. The other ends of the radial arc portions define two other locations at which a force is applied to the annular hub.

The fasteners are located in a body portion of the disk clamp. The radial arc portions of the load tabs are separated from the body portion by a slot having a selected depth dimension and a selected width dimension.

The selected depth dimension of each slot is defined by an angle defined by a line through an adjacent fastener and the radial center of an arc defining the end of the slot. The apex of the angle is at the rotational axis of the spindle.

The selected width dimension of each slot is defined by the diameter of the arc defining the end of the slot.

The annular hub has a conical surface defined by a selected conical angle having an apex at the rotational axis of the spindle.

The selected conical angle is selected to provide a conical surface on the annular hub having an angle greater than the angle assumed by the disk clamp when deflected by being fastened to the spindle.

In one embodiment, the selected conical angle is selected to be approximately 12 degrees.

The present invention is better understood upon consideration of the detailed description below, in conjunction with the accompanying drawings. As will become readily apparent to those skilled in this art from the following description there are shown and described embodiments of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The accompanying drawings incorporated in and forming a part of the specification, illustrate the present invention, and together with the detailed description below serve to explain the principles of the invention. In the drawings.

DETAILED DESCRIPTION

Figure 1:
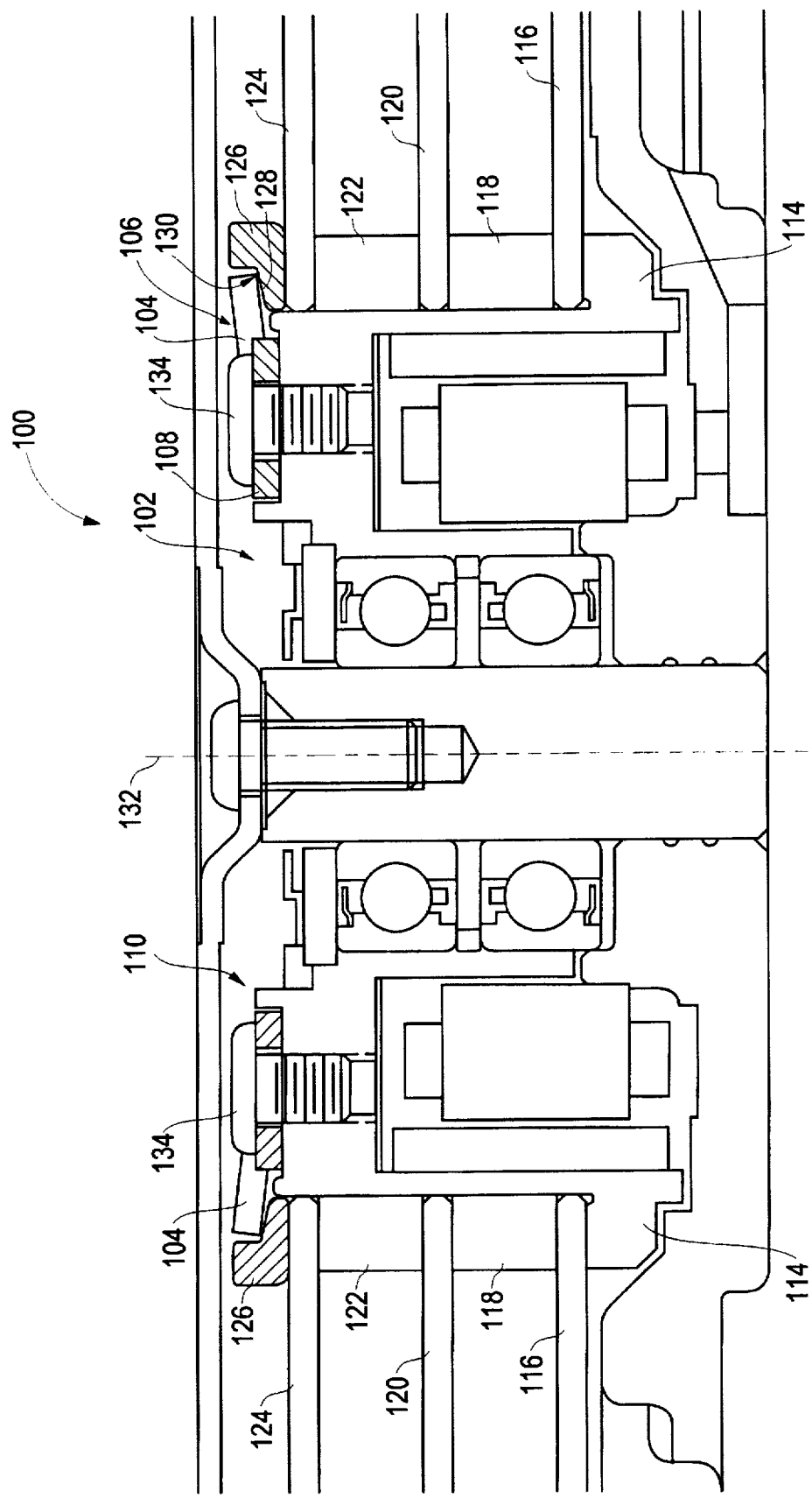
FIG. 1 shows the disk drive apparatus including the disk drive motor, the spindle, the disk clamp fastened to the spindle and three disks clamped by the annular hub.

Reference is now made in detail to an embodiment of the present invention, which illustrates the best mode presently contemplated by the inventors for practicing the invention. Alternate embodiments may also be described as applicable.

The present invention is a new disk drive clamp shaped to provide substantially equal forces to a predetermined number of locations on an annular hub that distributes force to a stack of disks. The application of the clamping force to a predetermined discrete number of locations provides that the total force will be applied more uniformly than if the contact between the disk clamp and the annular hub is a continuous line contact. The new disk drive clamp can be stamped or chemically etched from a flat sheet of isotropic spring material. The resulting disk clamp has no vertical dimension other than the thickness of the material. The disk clamp is fastened to the spindle of the disk drive by a selected number of fasteners which are located equidistant and symmetrically around the rotational axis of the spindle. When fastened to the spindle the disk clamp is deflected and the lower outer edge bears upon a conical surface of an annular hub allowing force to be exerted near the radial center of the annular hub which minimizes the torque applied by the disk clamp to the stack of disks. The conical surface is formed with a conical angle which is greater than the angle the disk clamp assumes at the point of contact with the annular hub when the disk clamp is deflected. This provides that the only contact points are the outer discrete and predetermined points on the lower outer edge of the disk clamp. The step height provided by the conical surface and the material of the disk clamp are chosen in such a way that the disk clamp and fasteners do not extend above the overall height of the annular hub. This provides the lowest possible profile.

The substantially equal forces applied by the disk clamp to the annular hub are verified using finite element analysis (FEA) software. The FEA software is a product available from ALGOR, 150 Beta Drive, Pittsburg, Pa. 15238.

The disk clamp is designed with a T-shaped load tab symmetrical to and between adjacent fastener locations. Thus, a disk clamp having four fasteners will have four T-shaped load tabs. Each load tab is designed to have four contact points. Therefore, a four tab design will have sixteen equidistant circumferential points of contact (four per load tab). The design of the disk clamp starts with the determination of the number of pressure points that are required. Once the number of pressure points is determined the shape of the disk clamp is designed to apply a substantially equal force at each of the predetermined points when the disk clamp is in the loaded state (fastened tightly to the spindle of the disk drive). This is accomplished interactively using the FEA program to determine the load tab shape. The disk clamp is carefully designed so contact with the annular hub occurs only at the predetermined contact points. The FEA software also provides information on material stress conditions of the loaded disk clamp so it can be determined if the disk clamp material used is within the proper material design limits.

FIG. 1 shows a disk drive apparatus 100 which includes a disk drive motor 102, a portion of the load tabs 104 of the disk clamp 106 and a portion of the body 108 of the disk clamp 106. The disk drive apparatus 100 also includes a spindle 110 which has an annular step 114 which engages one side of the inner periphery of the first disk 116. A first side of annular spacer 118 engages the other side of the inner periphery of the first disk 116. The other side of the annular spacer 118 engages the first side of the second disk 120. The other side of the inner periphery of the second disk 120 engages a first side of the second annular spacer 122. The second side of the second annular spacer 122 engages the inner periphery of the first side of the third disk 124. The inner periphery of the second side of the third disk 124 engages the annular hub 126. It should be understood that the description limited to three disks is arbitrary and the disk drive apparatus described could have other numbers of disks, including a disk drive apparatus having a single disk or two disks and a disk drive apparatus having more than three disks. The annular hub 126 has a conical surface 128 which engages the lower outer edge 130 of the load tab 104. The conical surface is formed at a conical angle having an apex at the rotational axis 132. The conical angle of the surface 128 is designed to be greater than the angle that the load tab 104 assumes when deflected under the load caused by the fasteners 134 being tightened. The angle assumed by the load tab 104 also has an apex at the rotational axis 132 when the forces applied are equal.

Figure 2:
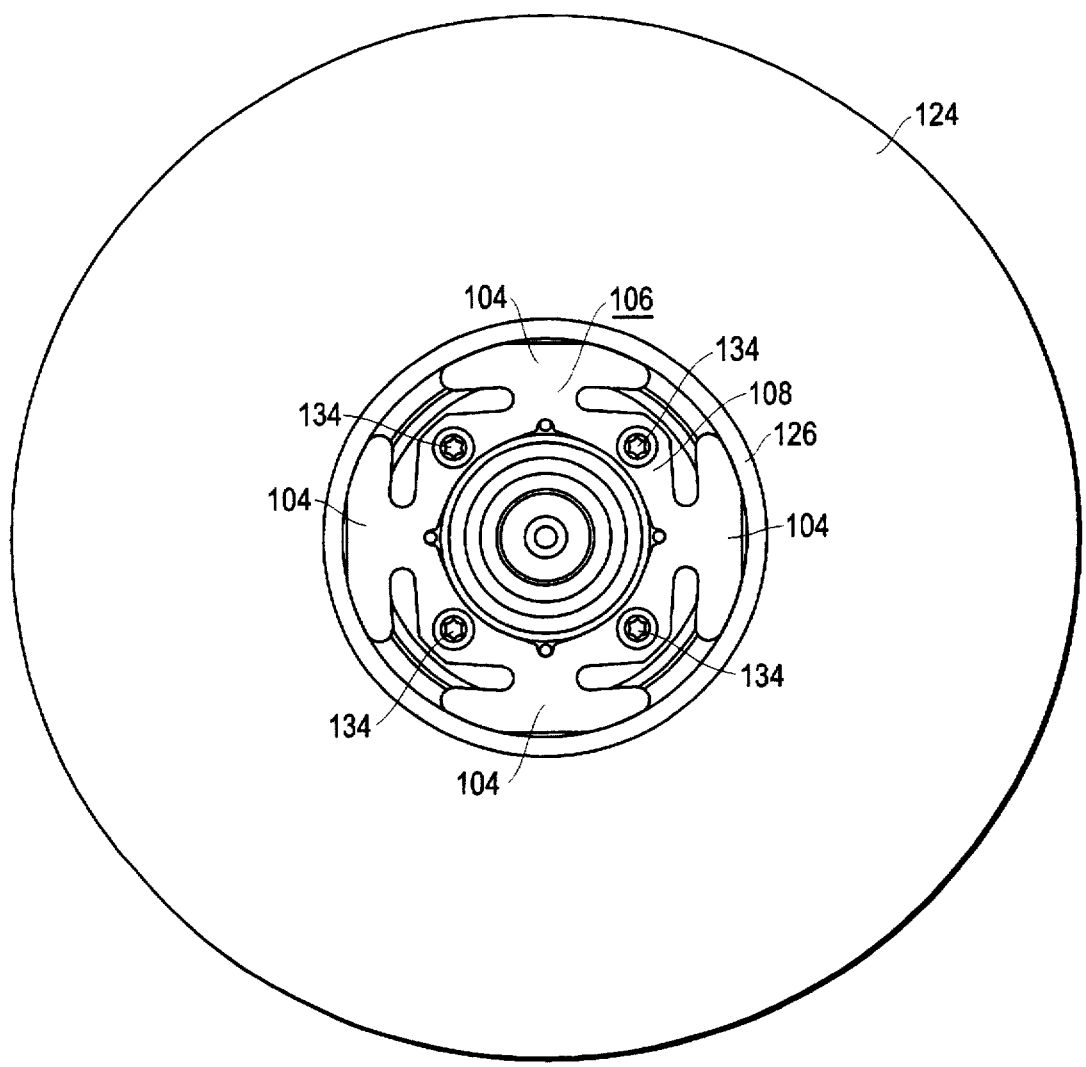
FIG. 2 shows a plan view of the disk clamp as fastened to the spindle.

FIG. 2 shows the plan view of the top disk 124, the load tabs 104 of the disk clamp 106, the body portion 108 of the disk clamp 106, the fasteners 134, and the annular hub 126.

Figure 3A:
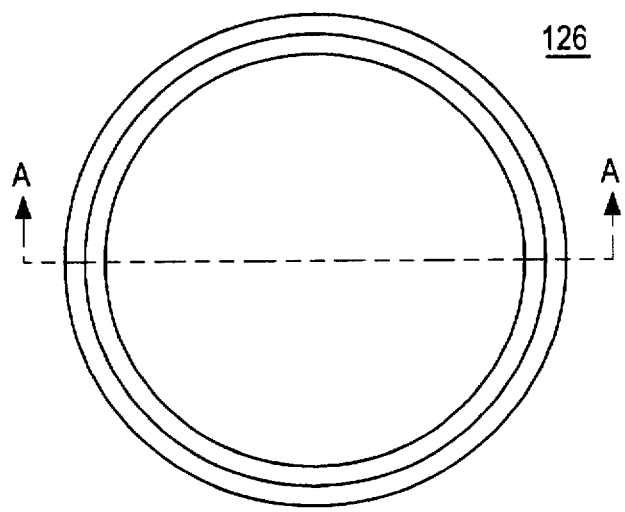
FIGS. 3A–3C show the top view, side view, and a detail view of the annular hub, respectively.
Figure 3B:
Figure 3C:
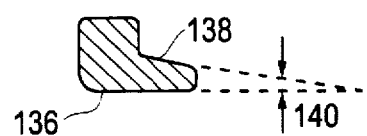

FIGS. 3A-3C show the details of the annular hub 126. FIG. 3A is a plan view of the annular hub 126 and FIG. 3B shows the cross-section taken along the section AA shown in FIG. 3A. FIG. 3C shows the detail of the cross-section of the annular hub 126. The annular hub 126 has a flat surface 136 that engages the inner periphery of the topmost disk 124 (FIGS. 1 and 2). The annular hub 126 has a conical surface 138 defined by an angle 140 with an apex at the axis of rotation 132 (FIG. 1). The angle 140 is selected to be greater than the angle that the load tabs 104 assume when loaded.

Figure 4A:
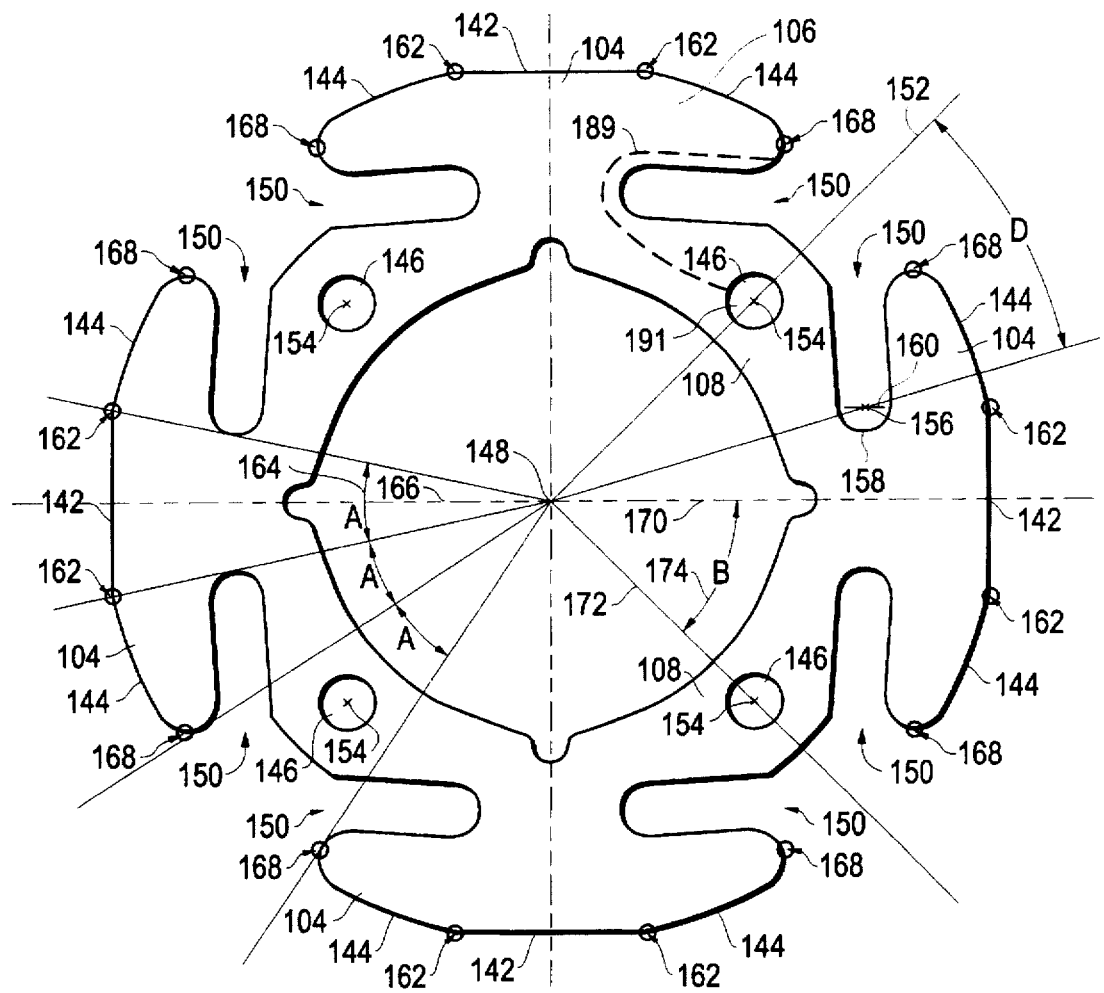
FIGS. 4A–4C show the top view and side view of the disk clamp and a representation of the bottom edge of the disk clamp as deflected when fastened to the spindle.
Figure 4B:
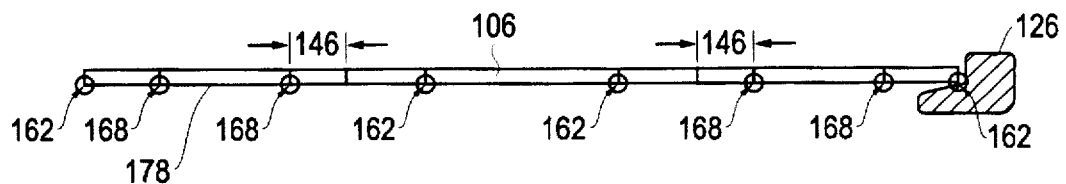
Figure 4C:
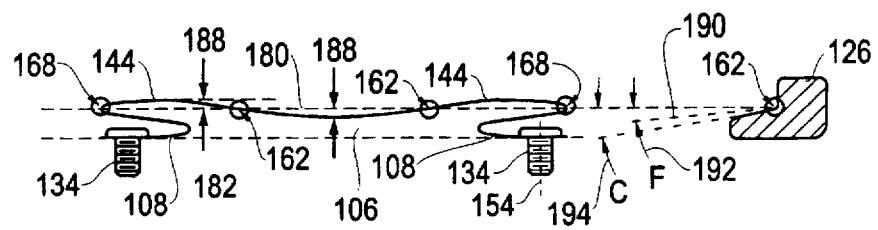

FIGS. 4A-4C show the details of the disk clamp 106. FIG. 4A shows the disk clamp 106 which is made up of a body portion 108 and T-shaped load tabs 104. Each load tab 104 has an outer edge made up of a flat portion 142 and a radial arc portion 144 on either side of the flat portion 142. The body portion 108 has fastener locations 146 equally spaced around the rotational axis, represented by point 148. It is noted that in this discussion, four fastener locations are shown and it is to be understood that the present invention comprehends either more fastener locations are less fastener locations. Each radial arc portion 144 is separated from the body portion 108 by a slot 150. Each slot has a selected depth defined by a depth angle D that has an apex at the rotational axis 148 and that is further defined by a line 152 drawn through the center 154 of the adjacent fastener location 146 and a line drawn through the center 156 of a radial arc defining the ends 158 of the slots 150. Each slot, in addition, has a selected width defined by the diameter 160 of the radial arc defining the end 158 of the slots 150. The intersections of the flat portions 142 of the T-shaped load tabs 104 with the radial arc portions 144 of the T-shaped load tabs 104 represented by encircled points 162 define two locations on the lower outer edge of the load tabs 104 that make point contact with the underlying annular hub (not shown in FIGS. 4A-4C). The disk clamp is designed such that the intersecting points 162 are defined by an angle A 164 that is equal to 360 degrees divided by 4 times N, where N is the number of fasteners (which is also the number of load tabs). The positions of the intersecting points 162 are defined by the fact that the center of angle A 164 corresponds with the center line 166 of the load tab 104. The ends of the load tabs 104, represented at by encircled points 168, define two locations on the lower outer edge of the load tabs 104 that make point contact with the underlying annular hub (not shown in FIGS. 4A-4C). Because all of the contact points between the load tabs 104 and the underlying annular hub are spaced equidistantly around the annular hub, the ends of the load tabs are also defined by the angle A 164. The centers 154 of the fastener locations 146 are spaced equidistantly around the rotational axis 148 and are separated by an angle of 360 degrees divided by N, where N is the number of fasteners. The angular separation between the center line 170 of a load tab 104 and the center line 172 of a fastener location 146 is an angle B 174 which is equal to 360 degrees divided by 2 times N, where N is the number of fasteners.

FIG. 4B shows the side view of the load tab 104 in an undeflected (unloaded) state, with one end resting on the annular hub 126. Shown on the bottom outer edge 178 are the contact points 162 and 168.

FIG. 4C shows only a portion of the bottom outer edge 178 of the disk clamp 106 in a deflected (loaded) state. (Only a portion of the deflected bottom outer edge 178 is shown for the purposes of clarity). The dotted line 180 represents the contact line on the annular hub 126 that an unshaped annular disk clamp would contact. As is illustrated in FIG. 4C the disk clamp deforms when fastened by the fasteners 134. The fasteners force the body portion 108 down to the top surface of the spindle represented by dotted line 182. As the body portion 108 of the disk clamp 106 is forced down the points of contact 162 and 168 cause the load tabs 104 to deform. Because there is a flat portion 142 which causes the flat outer portion of the load tab 104 to not reach the contact line 180 on the annular hub 126 the lower outer edge of the flat portion 142 deflects below the contact line 180 as indicated at 184. The lower outer edge of the radial arc portions 144 deflect above the contact line 180 as represented at 188. The ends of the radial arc portions curve back down to contack the annular hub 126. The explanation for this can be seen by examining FIG. 4A and dotted line 189. As a fastener in location 191 is tightened, the material around the fastener location 191 will be forced downward towards the spindle. The area around dotted line 189 represents areas where the disk clamp will also be forced downward. As can be appreciated, if more downward force is required at point 168, it can be achieved by either decreasing the depth of the slot 150 or decreasing the width of the slot 150.

Partial line 190 represents the lower edge of the angle that the load tab 104 assumes when it is deflected when the body portion 108 is fastened to the spindle. The angle between the horizontal and the lower edge of the load tab 104 is indicated by angle F 192. The conical angle C is indicated at 194. Both of these angles can be represented by angles having an apex at the rotational axis 132 (FIG. 1). The deformation of the outer edge of the load tabs 104 is allowed by the flat edge 142 of each of the load tabs 104 deflecting below the contact line 180 on the annular hub 126.

Figure 5:
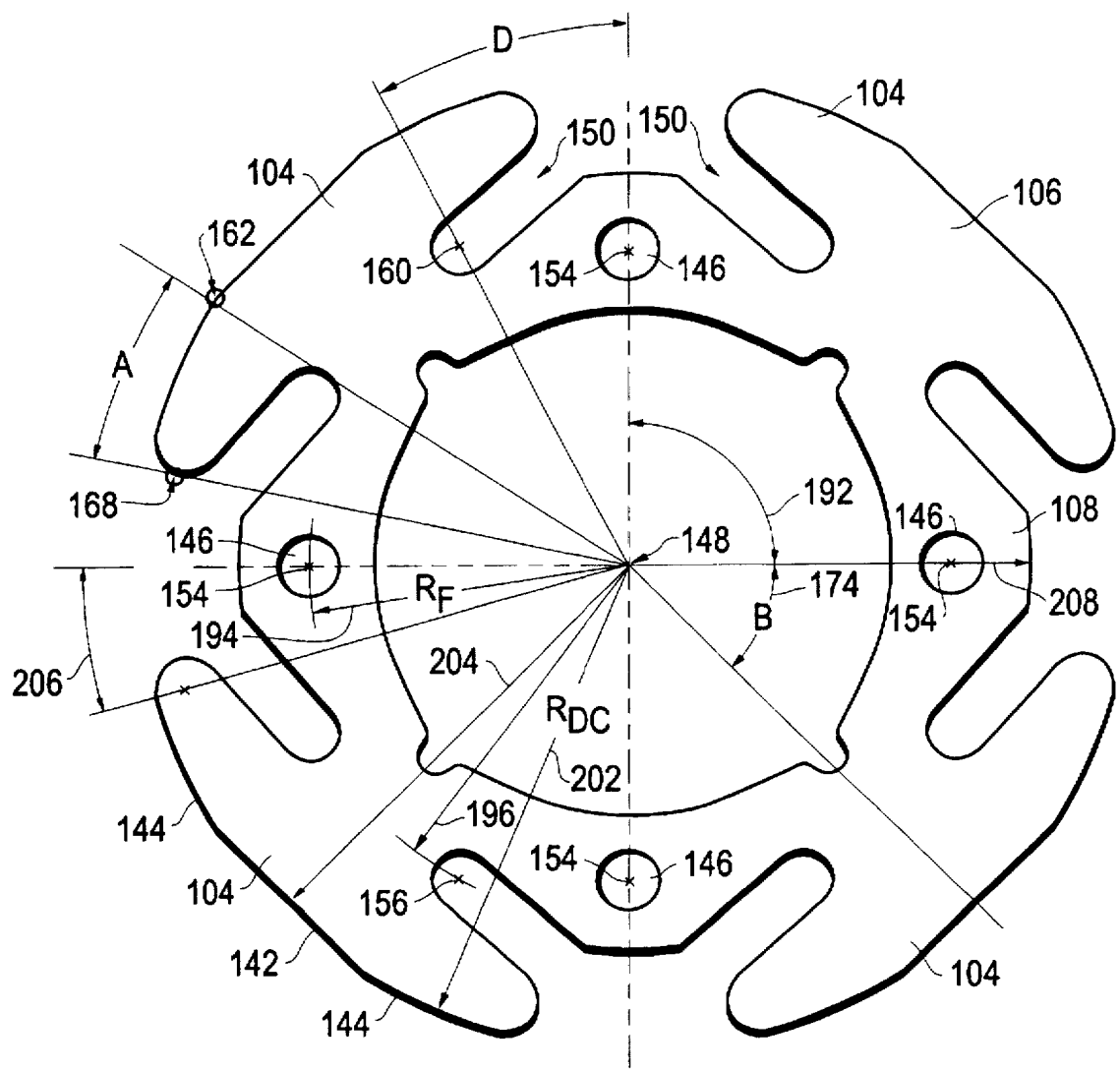
FIG. 5 shows a specific embodiment of the present invention.

FIG. 5 shows a specific embodiment of the present invention for the purposes of illustration and complete explanation. It is not intended that the invention will be restricted to the specific dimensions shown in FIG. 5. The dimensions provided in FIG. 5 are for a 2.5 inch disk drive system. The disk drive in FIG. 5 has four fasteners and thus, four load tabs 104. The centers 154 of the fastener locations 146, are spaced equidistantly around the center of rotation of the disk clamp, indicated at 148, and for a four fastener disk clamp the fasteners will be separated by an angle of 90 degrees (360 degrees divided by 4 (the number of fasteners) ), indicated at 192. The centers 154 of the fastener locations have a radius $R_F$ of 15 millimeters, indicated at 194. The angle B 174 is 45 degrees. The distance from the center of rotation 148 of the disk clamp 106 to the center of the arc defining the end of the slots 156 is 8.465 millimeters, indicated at 196. The angle A 198 is 22.5 degrees. The angle D, indicated at 200 is 28.86 degrees and the diameter 160 of the arc defining the width of the slots 150 is 1.27 millimeters. The outer radius of the disk clamp $R_{DC}$, indicated at 202, which defines the radial arc portions 144 of the load tabs 104 is 10.850 millimeters. The flat portion 142 is defined by trimming the outer radius to 10.64 millimeters, indicated at 204. The angular distance between the centers 154 of the fastener locations 146 and the center of the radial arc defining the ends of the radial arc portions 144 of the load tabs 104 is 12.40 degrees and is indicated at 206. The portions of the body portion 108 of the disk clamp 106 adjacent to the fastener locations 146 has a radius of 9.390 millimeters, indicated at 208. With above specific values incorporated into the FEA software (discribed above), the software calculated a force of 7.9 pounds at the points 168 and a force of 9.1 pounds at the points 162. These values can be adjusted, as discussed above, by varying the depth of the slots 150 and the width of the slots 160. These values were calculated with the disk clamp being made of 1707 PH condition C/CH-900 STSTL ASM-5529, the material having a minimum tensile strength of 240.000 PSI. The thickness of the disk clamp was 0.625±0.040 millimeters.

The foregoing description of the embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What I claim is:

1. A disk drive apparatus comprising:

a drive motor having a spindle;

a first disk having a central aperture through which the spindle is disposed, the spindle having a portion for engagement with a first side of the first disk at an inner periphery of the first disk;

a first annular spacer surrounding the spindle and having a first portion for engagement with a second side of the first disk at the inner periphery of the first disk;

at least a second disk having a central aperture through which the spindle is disposed, the first annular spacer having a second portion for engagement with a first side of the second disk at an inner periphery of the second disk;

an annular hub having a central aperture through which the spindle is disposed and having a portion for engagement with the second side of the second disk at the inner periphery of the second disk;

a disk clamp shaped to apply a substantially equal force to each of a predetermined number of locations on the annular hub wherein the predetermined number of locations are equally spaced around the annular hub; and a selected number of fasteners to attach the disk clamp to the spindle wherein the shaped disk clamp has multiple load tabs equal in number to the selected number of fasteners.

2. A disk drive apparatus comprising:

a drive motor having a spindle;

a first disk having a central aperture through which the spindle is disposed, the spindle having a portion for engagement with a first side of the first disk at an inner periphery of the first disk;

a first annular spacer surrounding the spindle and having a first portion for engagement with a second side of the first disk at the inner periphery of the first disk;

at least a second disk having a central aperture through which the spindle is disposed, the first annular spacer having a second portion for engagement with a first side of the second disk at an inner periphery of the second disk;

an annular hub having a central aperture through which the spindle is disposed and having a portion for engagement with the second side of the second disk at the inner periphery of the second disk;

a disk clamp shaped to apply a substantially equal force to each of a predetermined number of locations on the annular hub wherein the predetermined number of locations are equally spaced around the annular hub; and a selected number of fasteners to attach the disk clamp to the spindle.

wherein the shaped disk clamp has multiple load tabs equal in number to the selected number of fasteners, wherein a center of each load tab intersects an angle defined by lines through the center of two adjacent fasteners and having an apex at a center rotational axis of the spindle, wherein the fasteners are equally spaced around the spindle, and wherein each load tab applies a substantially equal force to each of four of the equally spaced locations on the annular hub.

3. The disk drive apparatus of claim 2, wherein each load tab has an outer edge having a flat portion and a radial arc portion on each side of the flat portion.

4. The disk drive apparatus of claim 3, wherein intersections of the flat portion and a first end of each of the radial arc portions define two locations at which the load tab applies a substantially equal force to the annular hub and a second end of each of the radial arc portions define two locations at which the load tab applies a substantially equal force to the annular hub.

5. The disk drive apparatus of claim 4, wherein the fasteners are located in a body portion of the disk clamp.

6. The disk drive apparatus of claim 5, wherein each portion of the load tab forming an arc portion of the load tab is separated from the body portion of the disk clamp by a slot having a selected depth dimension and a selected width dimension.

7. The disk drive apparatus of claim 6, wherein the selected depth dimension of each slot is defined by a slot depth angle defined by a line through a center of an adjacent fastener and a line through a radial center of an arc defining an end of the slot and wherein the slot depth angle has an apex at the rotational axis of the spindle.

8. The disk drive apparatus of claim 7, wherein the selected width dimension of each slot is defined by the diameter of the arc defining the end of the slot.

9. The disk drive apparatus of claim 8, wherein the annular hub has a conical surface defined by a selected conical angle with an apex at the rotational axis of the spindle.

10. The disk drive apparatus of claim 9, wherein the selected conical angle is selected to provide a conical surface on the annular hub having an angle greater than the angle assumed by the disk clamp when deflected by being fastened to the spindle.

11. The disk drive apparatus of claim 10, wherein the selected conical angle is selected to be 12 degrees.

12. A disk drive apparatus comprising:

a drive motor having a spindle;

at least a first disk having a central aperture through which the spindle is disposed, the spindle having a portion for engagement with a first side of the first disk at an inner periphery of the first disk;

an annular hub having a central aperture through which the spindle is disposed and having a portion for engagement with the second side of the first disk at the inner periphery of the first disk;

a disk clamp shaped to apply a substantially equal force to each of a predetermined number of locations on the annular hub wherein the predetermined number of locations are equally spaced around the annular hub; and a selected number of fasteners to attach the disk clamp to the spindle wherein the shaped disk clamp has multiple load tabs equal in number to the selected number of fasteners.

13. The disk drive apparatus of claim 12, wherein a center of each load tab intersects an angle defined by lines through the center of two adjacent fasteners and having an apex at a center rotational axis of the spindle, wherein the fasteners are equally spaced around the spindle, and wherein each load tab applies a substantially equal force to each of four of the equally spaced locations on the annular hub.

14. The disk drive apparatus of claim 13, wherein each load tab has an outer edge having a flat portion and a radial arc portion on each side of the flat portion.

15. The disk drive apparatus of claim 14, wherein intersections of the flat portion and a first end of each of the radial arc portions define two locations at which the load tab applies a substantially equal force to the annular hub and a second end of each of the radial arc portions define two locations at which the load tab applies a substantially equal force to the annular hub.

* * * * *